United States Patent [19]

Vardar

[11] Patent Number: 4,921,144
[45] Date of Patent: May 1, 1990

[54] SPOT SEEDER
[75] Inventor: Naci Vardar, Kapuskasing, Canada
[73] Assignee: Kimberly-Clark Corporation, Neenah, Wis.
[21] Appl. No.: 316,892
[22] Filed: Feb. 28, 1989

Related U.S. Application Data

[63] Continuation of Ser. No. 136,228, Dec. 21, 1987, abandoned.

[51] Int. Cl.$^5$ ............................................. G01F 11/10
[52] U.S. Cl. .................................. 222/336; 222/365; 222/501; 111/93; 221/266
[58] Field of Search ............. 222/366, 363, 365, 501; 221/266, 254; 111/96, 95, 93, 98

[56] References Cited

U.S. PATENT DOCUMENTS

| | | | |
|---|---|---|---|
| 139,732 | 6/1873 | Paterson | 222/366 |
| 558,448 | 4/1896 | Brown | 222/366 |
| 2,792,160 | 5/1957 | Jones et al. | 222/501 |
| 3,164,304 | 1/1965 | Jager et al. | 222/366 |
| 4,084,726 | 4/1978 | Nicol | 221/266 |
| 4,236,581 | 12/1980 | Beckett | 171/56 |
| 4,525,988 | 7/1985 | Harlan | 56/16.8 |

FOREIGN PATENT DOCUMENTS

| | | | |
|---|---|---|---|
| 115792 | 2/1903 | Norway | 111/96 |
| 1115241 | 5/1968 | United Kingdom | 222/366 |

Primary Examiner—Joseph J. Rolla
Assistant Examiner—Gregory L. Huson
Attorney, Agent, or Firm—William D. Herrick

[57] ABSTRACT

A combination spot seeder and tree harvesting mechanism which has a cylindrical seed canister with a top filler opening and a bottom dispensing opening. The spot seeder has a shaft with a seed pocket milled in it which shaft is slideably fitted within the dispensing opening for movement between a retracted position with the seed pocket inside the seed canister and an extended position with the seed pocket outside the seed canister. The seed pocket and the dispensing opening both have rounded edges to minimize damage to the seeds as the seed pocket is closed off by the dispensing opening. The spot seeder is mounted on a feller-buncher head, and the shaft is activated by each cutting stroke of the feller-buncher head.

8 Claims, 3 Drawing Sheets

SPOT SEEDER

This is a continuation application of application Ser. No. 07/136,228, filed on Dec. 21, 1987, and now abandoned.

BACKGROUND OF THE INVENTION

This invention relates generally to tree seeding devices and more particularly concerns a spot seeder to be used in connection with reforestation programs.

Direct seeding of trees is one of the most economical ways of regenerating a forest after harvesting of the trees. The degree of success of any seeding program depends heavily on the availability of receptive seed beds for germination. It is essential to have competition free microsites for establishment and survival of small germinants. As soon as trees are cut, all of the available receptive seed beds and microsites in the area will be exposed to direct sunlight, and biological activity will start immediately. It is important that the seeds of desirable species of trees get a quick start after harvesting has taken place so that those desirable species can compete with other forms of vegetation for the same site. Direct seeding applied before or during the harvesting of trees increases the chances of success for the desirable species.

Currently direct seeding operations are applied long after harvesting operations in three ways:
1. Broadcast seeding. Using helicopter or fixed wing aircraft for seeding requires site preparation and approximately 50,000 seeds per hectare (i.e. one million black spruce seeds equals one kilogram at $420 per kilogram resulting in $21 per hectare).
2. Manual spot seeding. Manual spot seeding requires approximately 15,000 seeds and 2.5 man days of labor per hectare.
3. Site preparation and seeding. This method requires 15,000 seeds and one third of a machine day and machine operator day per hectare. There is, however, no currently acceptable technique for seeding black spruce by machine.

SUMMARY OF THE INVENTION

It is therefore an object of the present invention to provide a direct seeding apparatus which sows seeds adjacent the harvesting site at the time the existing trees are harvested.

In order to achieve that objective, the present invention porivdes a spot seeder which can be attached to a feller-buncher head and which will automatically drop seeds around the stump while each tree is being cut. Particularly, the spot seeder consists of a seed canister with a filler opening and a dispensing opening and a shaft slideably fitted in the dispensing opening for movement between a retracted position and an extended position. The shaft has a small seed pocket milled into one of its surfaces and sized to accommodate the optimum number of seeds that should be seeded at each stump. In the retracted position of the shaft, the seed pocket is inside the seed canister where it fills with seeds. Once the shaft is extended, the seed pocket is outside of the seed canister, and the seeds may fall freely from the seed pocket onto the surrounding area. The shaft is driven by a cam attached to the cutting jaws of the feller-buncher head so that with each cutting cycle seeds are sown near the stump. The seed pocket and dispensing opening are shaped so that the chance of crushing or splitting seeds during the movement of the shaft is minimized.

The canister is fitted with a waterproofed cover and an overlaying cap which helps protect the seeds in the canister from moisture and also provides a weight to assure that the shaft is urged from its retracted position with the seed pocket inside the canister to its extended position with the seed pocket outside of the canister.

By direct sowing of the seeds from a spot seeder attached to the buncher-feller head, the activity around the stump including the vehicular and human activity assists in packing the seeds into the surrounding area.

Other objects and advantages of the present invention will become apparent upon reading the following detailed description and upon reference to the drawings.

DETAILED DESCRIPTION OF THE INVENTION

While the invention will be described in connection with a preferred embodiment, it will be understood that I do not intend to limit the invention to that embodiment. On the contrary, I intend to cover all alternatives, modifications, and equivalents as may be included within the spirit and scope of the invention as defined by the appended claims.

Figure 1:
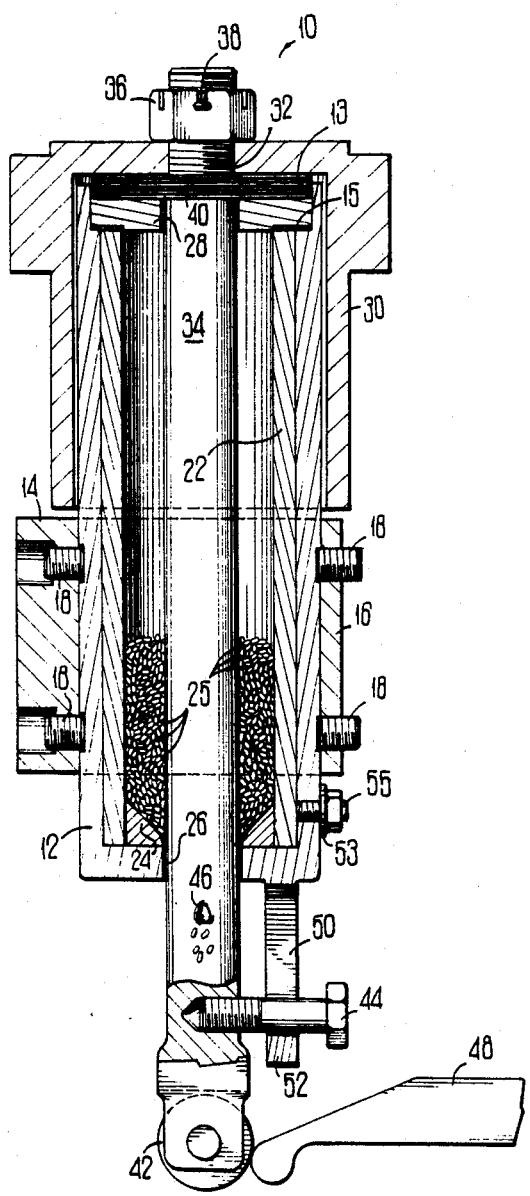
FIG. 1 is a front elevation view of the spot seeder with a shaft in its extended position.

Turning to FIG. 1, there is shown a spot seeder 10 of the present invention. The spot seeder 10 comprises a seed canister 12 which is generally cylindrical in shape and has a top filler opening 13 and a bottom seed dispensing opening 26. A seed dispensing shaft 34 is slideably fitted through the dispensing opening 26 and is connected to a cap 30 which covers the filler opening 13.

A mounting bracket 14 is attached to the seed canister 12 by means of a encircling mounting pipe 16. The mounting pipe is locked onto the seed canister 12 by means of set screws 18 threaded into the side of the mounting pipe 16. The set screws 18 engage annular recess rings 20 cut around the outside of the seed canister. The mounting pipe 16 can be rotated to any orientation around the circumference of the seed canister 12 and then locked onto the seed cansiter by means of the set screws 18 engaging the annular rings 20.

A seed canister liner 22 for holding seeds 25 is nested inside the seed canister 12. The seed canister liner has a funnel opening 24 at its lower end which aligns with and directs seeds toward dispensing opening 26 in the lower end of the seed canister 12. The seed canister liner 22 has a liner cover 28 which is positioned within the sides of seed canister 12 at top filler opening 13 and abuts against the top 15 of the seed liner 22 to form a moisture seal at the top 15 of the seed canister liner 22.

The cylindrical cap 30 fits over the top opening 13 of the seed canister 12 and extends downward around the outside of the seed canister. The cap 30 has a threaded opening 32 in its top and into which is threaded cylindrical shaft 34. The cylindrical shaft 34 is locked into the cap 30 by means of locking nut 36 which is retained by a cotter pin 38. A compression spring 40 encircles shaft 34 between the cap 30 and the liner cover 28 and urges the cap 30 away from liner cover 28. The spring 40 holds the liner cover 28 firmly against the top 15 of the seed canister liner 22 to seal the liner. In addition, the spring 40 provides a shock absorber for the shaft 34 as it slides from its retracted (up) position to its extended (down) position.

Figure 7:
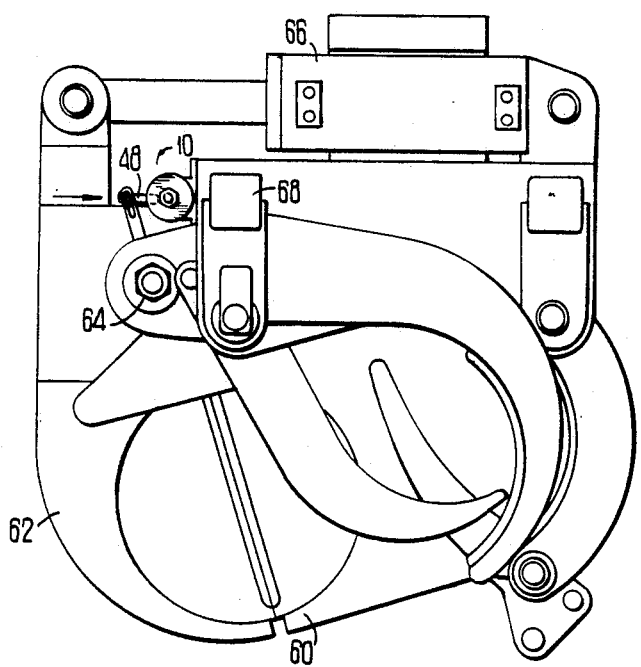
FIG. 7 is a top plan view of the spot seeder attached to a feller-buncher head.

The shaft 34 has a seed pocket 46 hollowed out of one of its sides and position along the length of the shaft so that when the shaft is retracted (FIG. 2) the seed pocket 46 is inside the seed cansiter 12 and when the shaft is extended (FIG. 1) the seed pocket is outside the seed canister 12. The shaft 34 has a cam follower 42 which engages laterally moving cam 48. Cam 48 is attached to a feller-buncher head 61 (FIG. 7). When the lateral cam 48 is in position shown in FIG. 1, the shaft 34 is in its extended position as a result of its own weight and the weight of cap 30. When the cam is in the position shown in FIG. 2 the shaft 34 is in its retracted position. The rotational orientation of the shaft 34 is constricted by means of alignment bolt 44 which is threaded into the shaft and retained in slot 50 of keeper 52. Keeper 52 is securely mounted to the seed canister 12. A latch 53 is pivotally mounted on bolt 55 and engages bolt 44 to retain the shaft 34 in its retracted position when the seeder is not in use.

In operation, the spot seeder 10 is mounted to conventional feller-buncher head 61 shown in FIG. 7. The feller-buncher head 61 includes a stationary cutting jaw 60 and a moveable cutting jaw 62 that pivots about pivot point 64. The moveable cutting jaw 62 is driven by means of hydraulic cylinder 66. When the hydraulic cylinder 66 is in its retracted position, the jaws 62 and 60 are open to accommodate a tree trunk. Once the tree trunk is positioned within the open jaws 60 and 62, the hydraulic cylinder 66 extends thereby closing moveable jaw 62 to sever the tree trunk.

Figure 2:
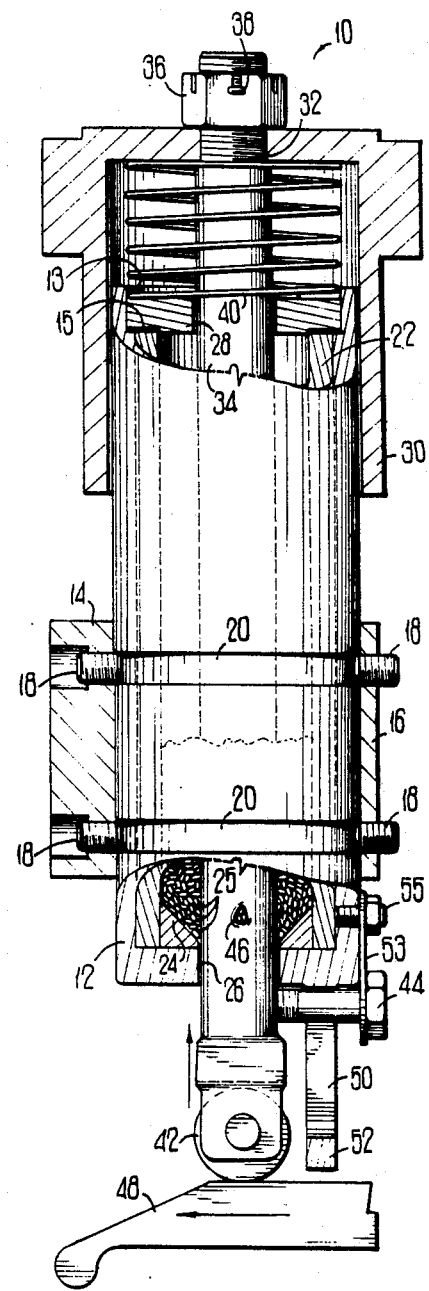
FIG. 2 is a front elevation view of the spot seeder with a shaft in its retracted position.

The spot seeder 10 is mounted to the feller-buncher frame member 68 adjacent the pivot 64. The cam 48 is securely attached to the moveable jaw 62 in alignment with the cam follower 42 of the spot seeder 10. When the cylinder 66 is retracted to open the jaw 62, the cam 48 moves into engagement with the cam follower 42 to push the shaft 34 into its retracted position (FIG. 2). With the shaft 34 in its retracted position, seeds in the seed canister liner 22 collect in seed pocket 46 on the shaft within the seed canister liner 22. Once the jaws of the feller-buncher head have been positioned around a tree trunk, the jaws 60 and 62 are closed by means of cylinder 66. As the jaws close the cam 48 moves out from under the spot seeder allowing the shaft 34 to descend to its extended position (FIG. 1). Once the seed pocket 46 in the shaft 34 clears the confines of dispensing opening 26 of the seed container 18, the seeds in seed pocket 46 are free to fall to the ground adjacent the stump that has just been severed.

Figures 3, 4:
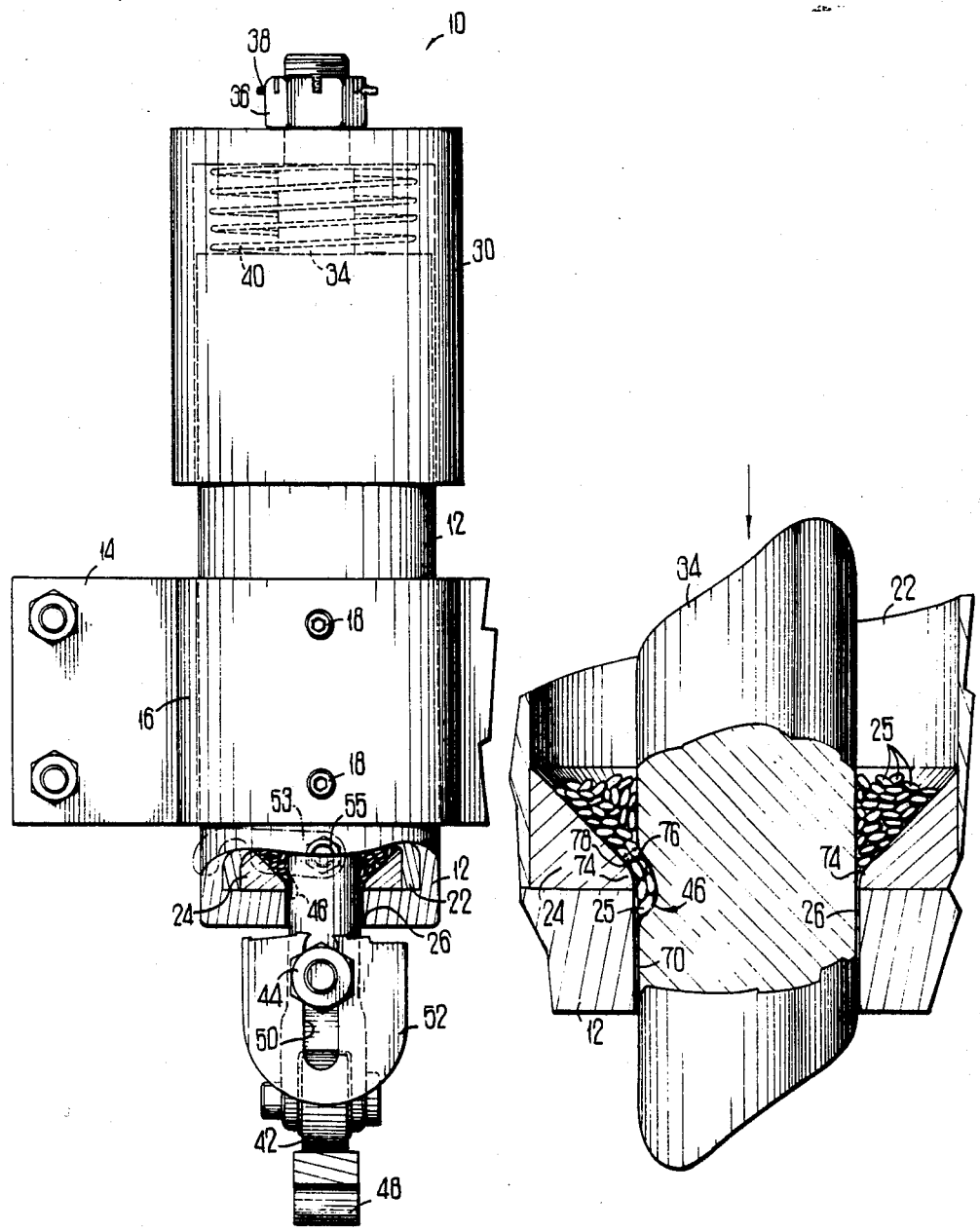
FIG. 3 is a side elevation view of the spot seeder with a shaft in its partially extended position.
FIG. 4 is a detailed section view of the seed pocket and dispensing opening of the spot seeder with a shaft in the partially extended position.

As the shaft 34 descends, the dispensing opening 26 first closes off the seed pocket 46 to contain the requisite number of seeds 25 and isolate them from the seeds in the seed canister liner 22. FIG. 3 illustrates the position of the shaft 34 in its descent just before the seed pocket 46 is closed off by the dispensing opening 26. At the midpoint of its descent, the seed pocket 46 is comletely within the confines of the dispensing opening 26 so that no further seeds can enter the seed pocket nor can the seeds escape from the seed pocket. When the shat 34 has descended to its fully extended position (FIG. 1), the seed pocket is outside the dispensing opening 26 and the seeds are free to fall from the seed pocket onto the ground.

Turning to FIG. 4, the seed pocket 46 and the dispensing opening 26 are shown in greater detail just before the seed pocket is closed off by the dispensing opening during descent of the shaft 34. The seed pocket 46 is sized to hold four to six seeds. In the case of black spruce, the seed pocket 46 is sized to be about four to six cubic millimeters in volume. As can be seen in FIG. 4, it is important that the tolerance 70 between the shaft 34 and the dispensing opening 26 be less than one half the diameter of a seed 25 so that the seeds 25 cannot become jammed between the dispensing opening 26 and the shaft 34. It is also important that the upper edge 74 of the dispensing opening 26 be rounded and that the edge 76 of the seed pocket 46 likewise be rounded so that seeds are not crushed or damaged by the shearing action in the gap 78 between the opening edge 74 and the pocket edge 76.

Figures 5, 6:
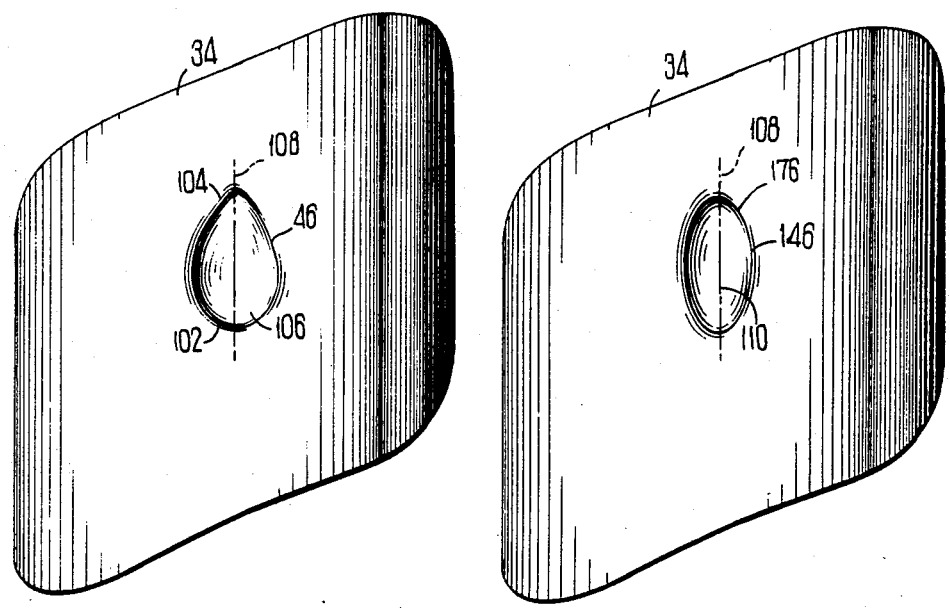
FIG. 5 is a detailed front elevation view of an egg-shaped seed pocket.
FIG. 6 is a detailed elevation view of an elliptical shaped seed pocket.

In order to minimize further the possibility of shearing and damage to the seeds, the seed pocket 46 is preferably egg-shaped with a large end 102 and a small end 104 (FIG. 5). The egg-shaped seed pocket 46 is oriented so that a line 106 running from the large end to the small end is parallel to the axis 108 of the shaft 34. Particularly, the small end 104 of the egg-shaped profile is at the top of the seed pocket 46 thereby providing minimal edge length in gap 78 (FIG. 4) along which seeds may be trapped during the downward movement of the shaft 34 as the seed pocket 46 is closed off by the dispensing opening 26. While somewhat less preferred, an elliptical-shape shown in FIG. 6 for seed pocket 146 is also useful to minimize damage to the seeds as a result of any shearing force in gap 78 between edge 176 of the seed pocket 146 and edge 74 of the dispensing opening 26 respectively. Particularly, the seed pocket 146 is oriented so that the major axis 110 of the ellipse is parallel to axis 108 of shaft 34.

I claim:

1. A spot seeder for sowing tree seeds during harvesting and adjacent a harvesting site comprising:
  a. a seed canister mounted on and interconnected to a tree harvesting implement, which canister has:
    i. a filler opening for filling the canister with tree seeds; and
    ii. a dispensing opening in a wall of the canister, which wall has a thickness;
  b. a shaft slideably fitted in the dispensing opening for movement between a retracted position and an extended position, wherein the shaft has:
    i. an axis; and
    ii. a pocket formed therein, which pocket is sized to accommodate a number of seeds, has a length parallel to the shaft axis, which length is less than the thickness of the canister wall, is located on the shaft so that the pocket is within the canister when the shaft is in the retracted position and is outside the canister when the shaft is in the extended position; and c. means acitivated by said tree harvesting implement when harvesting a tree for driving the shaft between the retracted position and extended position.

2. The spot seeder of claim 1, wherein the dispensing opening and the pocket both have rounded edges.

3. The spot seeder of claim 2, wherein the pocket is elliptical in shape with a major axis parallel to the axis of the shaft.

4. The spot seeder of claim 2, wherein the pocket is egg-shaped with a small end and a large end and is oriented on the shaft so that a line running from the large end to the small end is parallel to the shaft axis and the small end is closer than the larger end to the dispensing opening when the shaft is extended.

5. A spot seeder for sowing tree seeds during harvesting and adjacent a harvesting site comprising:
 a. a seed canister mounted on and interconnected to a tree harvesting implement, which canister has:
  i. a top filler opening for filling the canister with tree seeds;
  ii. a dispensing opening in a wall of the canister, which wall has a thickness;
  iii. a funnel inside the canister for directing tree seeds therein toward the dispensing opening;
  iv. a cover overlaying the filler opening for sealing the filler opening;
  v. a cap overlaying the cover and surrounding a portion of the canister; and
  vi. a spring between the cap and the cover to hold the cover in engagement with the filler opening;
 b. a shaft slideably fitted in the dispensing opening and connected to the cap for movement along with the cap between a retracted position and extended position, wherein the shaft has;
  i. an axis;
  ii. a pocket formed therein, which pocket is sized to accommodate a number of seeds, has a length parallel to the shaft axis that is less than the thickness of the canister wall, and is located on the shaft so that the pocket is inside the canister when the shaft is in the retracted position and is outside the canister when the shaft is in the extended position; and
 c. means activiated by said tree harvesting implement for driving the shaft between the retracted position and the extended position when harvesting a tree.

6. The spot seeder of claim 5, wherein the dispensing opening and the pocket both have rounded edges.

7. The spot seeder of claim 6, wherein the pocket is elliptical in shape with a major axis parallel to the axis of the shaft.

8. The spot seeder of claim 6, wherein the pocket is egg-shaped with a small end and a large end and is oriented on he shaft so that a line runing from the large end to the small end is parallel to the shaft axis and the small end is closer than the large end to the dispensing opening when the shaft is extended.

* * * * *

UNITED STATES PATENT AND TRADEMARK OFFICE
CERTIFICATE OF CORRECTION

PATENT NO. : 4,921,144
DATED : May 1, 1990
INVENTOR(S) : Naci Vardar

It is certified that error appears in the above—identified patent and that said Letters Patent is hereby corrected as shown below:

Column 4, line 4, "is comletely" should read --is completely--;

Column 4, line 7, "When the shat" should read --When the shaft--;

Column 5, line 14, "larger end" should read --large end--;

Column 6, line 26, "on he shaft" should read --on the shaft--

Signed and Sealed this

Thirty-first Day of August, 1993

Attest:

BRUCE LEHMAN

Attesting Officer

Commissioner of Patents and Trademarks